Aug. 12, 1969 H. K. HAZEL ET AL 3,460,245

METHOD FOR WIRING FERRITE CORE MATRICES

Filed April 30, 1965 4 Sheets-Sheet 1

INVENTORS
HERBERT K. HAZEL
WOLFGANG F. MUELLER

BY James E. Murray
ATTORNEY

Aug. 12, 1969 H. K. HAZEL ET AL 3,460,245

METHOD FOR WIRING FERRITE CORE MATRICES

Filed April 30, 1965 4 Sheets-Sheet 2

METHOD FOR WIRING FERRITE CORE MATRICES

Filed April 30, 1965 4 Sheets-Sheet 3

Aug. 12, 1969 H. K. HAZEL ET AL 3,460,245

METHOD FOR WIRING FERRITE CORE MATRICES

Filed April 30, 1965 4 Sheets-Sheet 4

United States Patent Office 3,460,245
Patented Aug. 12, 1969

3,460,245

METHOD FOR WIRING FERRITE CORE MATRICES

Herbert K. Hazel, Poughkeepsie, and Wolfgang F. Mueller, Wappingers Falls, N.Y., assignors to International Business Machines Corporation, Armonk, N.Y., a corporation of New York Filed Apr. 30, 1965, Ser. No. 452,101
Int. Cl. H01f 7/06; B23p 19/04
U.S. Cl. 29—604 11 Claims

ABSTRACT OF THE DISCLOSURE

This specification describes the wiring of ferrite core matrices. First a number of wires with apertured ferrite elements strung on them are arranged side by side to form columns of ferrite elements that slide back and forth on the wires. Thereafter, one element on each length of wire is advanced to a wiring position to form a first selected row of ferrite elements. Then a row wire is inserted through the ferrite elements in the first selected row. After row wire is inserted, the ferrite elements of the row are tested. Once the ferrite cores in the first selected row test good, the process is repeated for a second row. Preferably, the selected row of ferrite elements is held in position by air directed at the elements.

Background of the invention

The present invention relates to the wiring of apertured articles into coordinate groupings and more particularly to the wiring of ferrite cores into matrices.

Apertured ferrite elements, commonly referred to as ferrite or magnetic cores, are used quite extensively as storage elements in the random access memories of computers. In such memories, the ferrite elements are arranged in coordinate groupings called matrices on wires that are threaded through the apertures in the elements in at least two coordinate directions to permit the transmission of electrical signals along the wires to and from each of the elements. The threading of the wires through the apertures has always been tedious, time consuming and subject to error. Now it is further complicated by recent reductions in the size of the ferrite elements. These reductions in size make it extremely difficult, if not impossible, to commercially fabricate the ferrite elements of the new reduced size into matrices using current threading techniques and equipment. They also make it very difficult to repair defects in the completed matrices since this usually involves the hand threading of wires through the elements.

Therefore, it is an object of the present invention to provide improved methods and apparatus for the wiring of coordinate groupings of apertured articles.

Another object of the invention is to enable the rapid and efficient wiring of very small ferrite elements into matrices.

A further object of the invention is to simplify the repair of defects in ferrite core matrices.

Other objects of the invention are to simplify the wiring of ferrite elements into matrices; prevent damage to the ferrite elements or the wires threaded through them during the fabrication of matrices; and provide wiring techniques and apparatus which are adaptable to the automatic threading of ferrite elements into matrices.

Summary

In accordance with the present invention, a number of lengths of wire each with apertured ferrite elements prestrung thereon are positioned along side each other to form columns of ferrite elements. Thereafter, the ferrite elements in the columns are wired into their coordinate positions in the matrix one row after another by advancing one element on each length of wire to wiring position to form a selected row of ferrite elements and then inserting wire through the ferrite elements in the selected row while they are properly oriented against a referencing member with air directed at them.

As shall be more apparent after reading the complete specification, fabrication in this manner enables the rapid assembly of small ferrite elements into matrices with a minimum of damage to the elements and the wires threaded through them. Furthermore, by testing each row of ferrite elements as it is being wired by the above described method, any defective element can be detected and replaced prior to the completion of its wiring. This simplifies the replacement of the defective elements, first of all, because it does not require the disassembly of the matrix, and secondly, because it allows the apparatus used to wire the matrix to be employed in the repair of the defect.

Description of the drawings

The foregoing and other objects, features and advantages of the invention will be apparent from the following more particular description of preferred embodiments of the invention, as illustrated in the accompanying drawings.

Description of the embodiments of the invention

Figure 1:
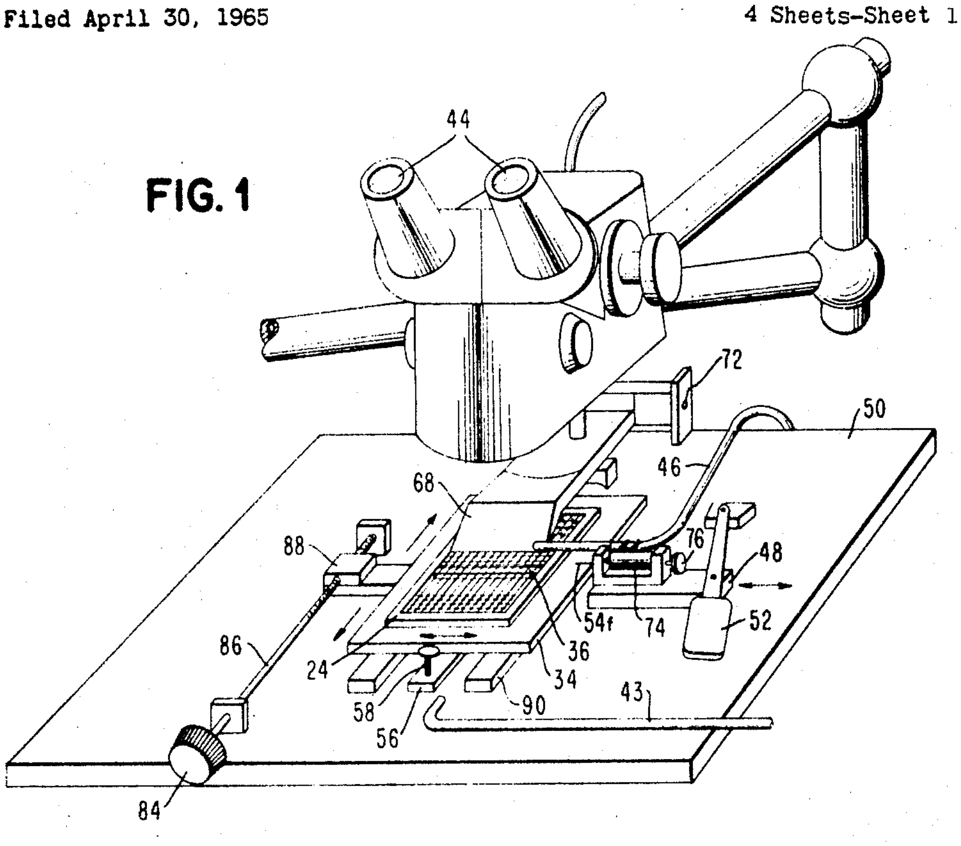
FIGURE 1 is a perspective view of apparatus for the wiring of matrices in accordance with the present invention.
Figures 2, 4:
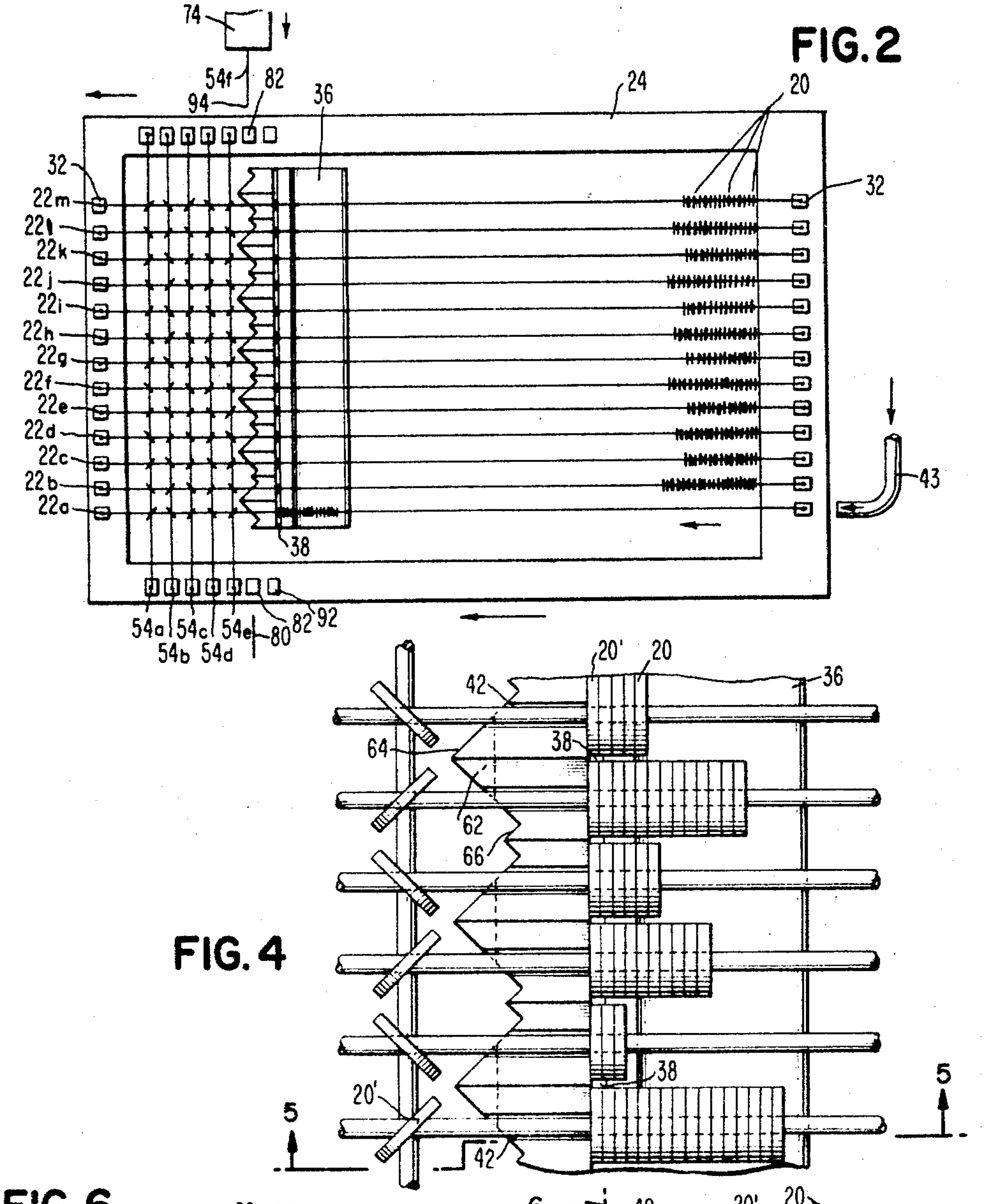
FIGURE 2 is a plan view of the core matrix shown in the process of being wired with the apparatus shown in FIGURE 1.
FIGURE 4 is a plan view of a portion of the core matrix of FIGURE 2 showing the prestrung cores advanced for the selection of the next row of cores to be wired.
Figure 6:
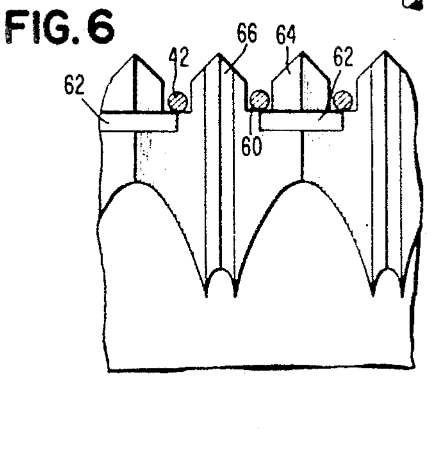
FIGURE 6 is a plan view taken along line 6—6 in FIGURE 5.

The apparatus illustrated in FIGURES 1 and 2 can be used to wire small, apertured ferrite elements, or cores, into memory matrices. However, prior to the wiring of the cores 20 into their matrix positions with this apparatus, the cores 20 are strung on wires 22*a* through 22*m* and the wires are thereafter arranged parallel to each other in a frame 24.

Figure 3:
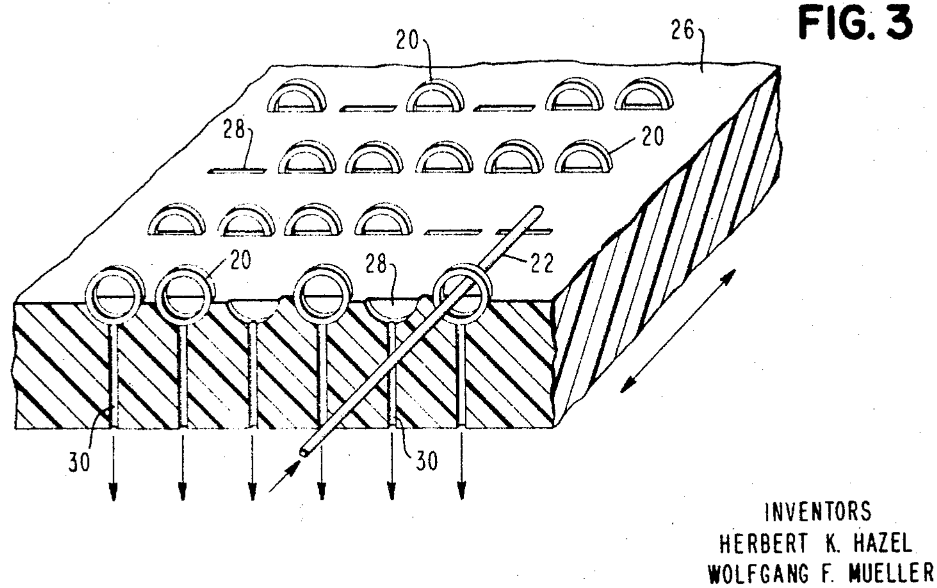
FIGURE 3 is a schematic illustrating one way of stringing cores on wire.

The stringing of the cores 20 on the wires 22*a* through 22*m* can be carried out in the manner illustrated in FIGURE 3. The cores 20 are spread across the top surface of a vibrating member 26 which has a number of semi-cylindrical slots 28 in its top surface that are connected to its bottom surface by passageways 30. A vacuum is applied to the bottom surface so that as the member vibrates the cores will slide across the top surface and be positioned in the slots 28 as illustrated by the suction produced by the vacuum. Once the cores 20 are in the slots 28, the vibrating of the member 26 is stopped and a wire 22 is moved over the member 26 in close proximity to the top surface so that it picks up a number of cores 20 in the manner illustrated. The above is repeated until the desired number of cores 20 are on each of the wires 22*a* through 22*m*. The wires 22*a* through 22*m* are then arranged parallel to one another in the frame 24 by stretching the wires 22*a* through 22*m* across the frame and soldering their ends to tinned contact areas 32 on opposite sides of the frame.

With the wires 22*a* through 22*m* mounted in it, the frame 24 is positioned on an annular platform 34 in the wiring apparatus of FIGURE 1. The annular platform 34 is located over a core selection and reference member 36 which first selects a row of cores to be wired with a second wire and then holds these cores properly oriented while the second wire is passed through each of them at right angles to the wires 22*a* through 22*m*.

Figure 5:
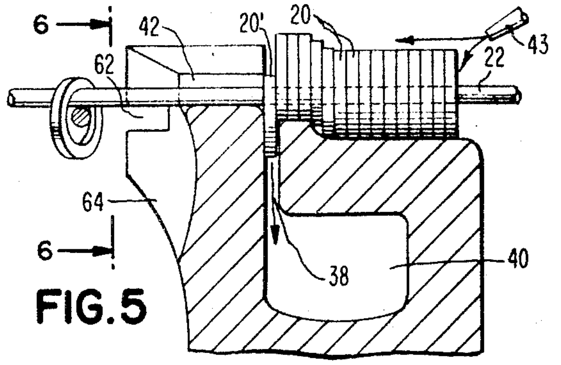
FIGURE 5 is a sectional view taken along line 5—5 in FIGURE 4.

The member 36 has a slot 38 arranged transverse to the wires 22*a* through 22*m*. As is illustrated in FIGURE 5, this transverse slot 38 leads to a cavity 40 which is held under vacuum so that air is drawn into the cavity 40 through the slot 38. With the member 36 in its operating position, the wire 22*a* through 22*m* pass over the slot 38 and through a wiring jig portion of the member in passageways 42 which are slightly wider than the thickness of wires. To select a row of cores for wiring, an air jet 43 is positioned behind the loose cores 20 so that the stream of air from the jet advances the cores along the wires 22*a* through 22*m* until the leading core 20′ in each line of cores hits the back edge of the wiring jig portion of the member 36, and is drawn into the slot 38 along with the air being sucked thorugh the slot into the cavity 40 by the vacuum. Only the leading core 20′ on each wire 22 slips into the slot 38 in the manner shown in FIGURE 5, because the slot is not wide enough for two cores to fiit into it.

After the cores 20 have been advanced, the slot 38 is examined to make sure one core 20′ on each of the wires 22*a* through 22*m* is in the slot 38. Cores with an outside diameter as small as 12 mils and an inside diameter as small as 7 mils have been wired into matrices using the present techniques and it is anticipated that these techniques will be employed to wire matrices of even smaller cores in the future. Therefore, the microscope 44 is provided to make examinations when it is not possible to see what is going on with the naked eye.

Figures 7, 8:
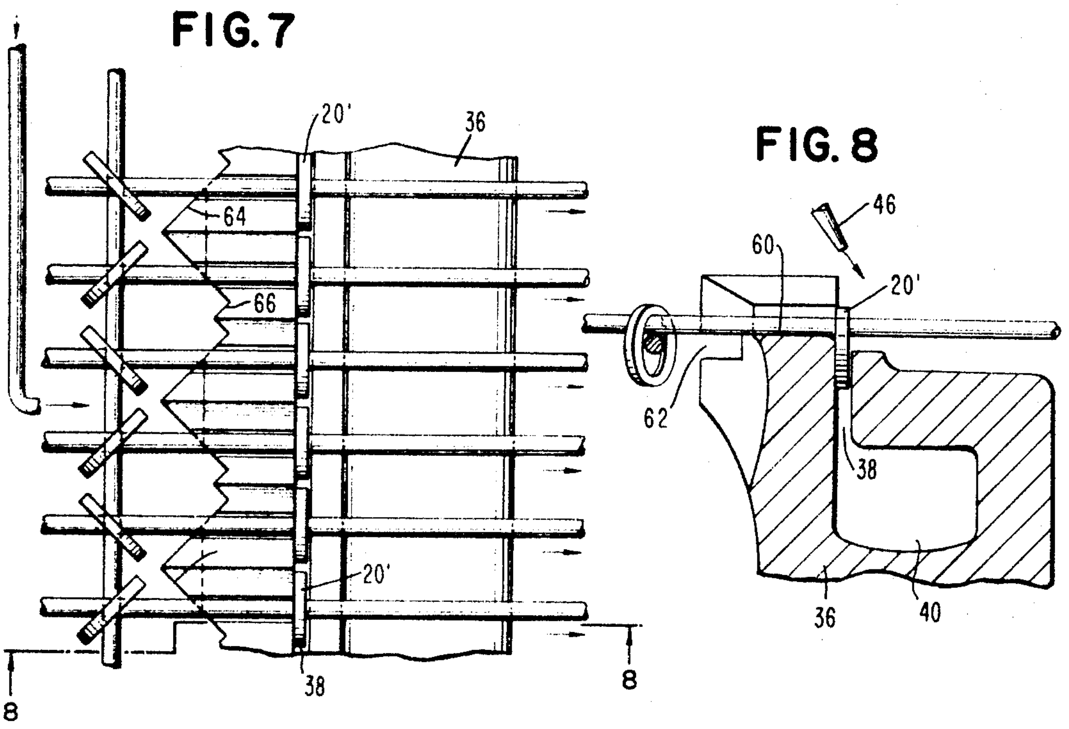
FIGURE 7 is a plan view of a portion of the core matrix of FIGURE 2 showing the next row of cores to be wired separated from the other loose prestrung cores on the wires.
FIGURE 8 is a sectional view taken along line 8—8 in FIGURE 7.

After the leading core 20′ on each of the wires 22*a* through 22*m* has been positioned in the groove 38, a second air jet 46 is used to blow the loose cores 20 back away from the groove 38. As is shown in FIGURE 1, this second air jet 46 is mounted on a sliding block 48 which moves transverse to the wires 22*a* through 22*m* across the main supporting surface 50 of the matrix wiring apparatus when a handle 52 of the apparatus is moved. The handle 52 is moved back and forth a few times so that the jet 46 moves the length of member 36 and directs air against the cores 20 on each of the wires 22*a* through 22*m*. As is illustrated in FIGURES 7 and 8, the jet 46, as it passes over each of the wires 22*a* through 22*m*, blows all the loose cores 20 except the first loose core 20′ on each wire back away from the member 36. The reason core 20′ is not blown back is because it is held in the groove 38 by the vacuum in the cavity 40 while the other loose cores, being free of the vacuum, slide along each wire to the rear of the frame 24. Thus the first core 20′ on each of the wires 22*a* through 22*m* is separated from the remainder of the unwound cores 20.

Figures 9, 10:
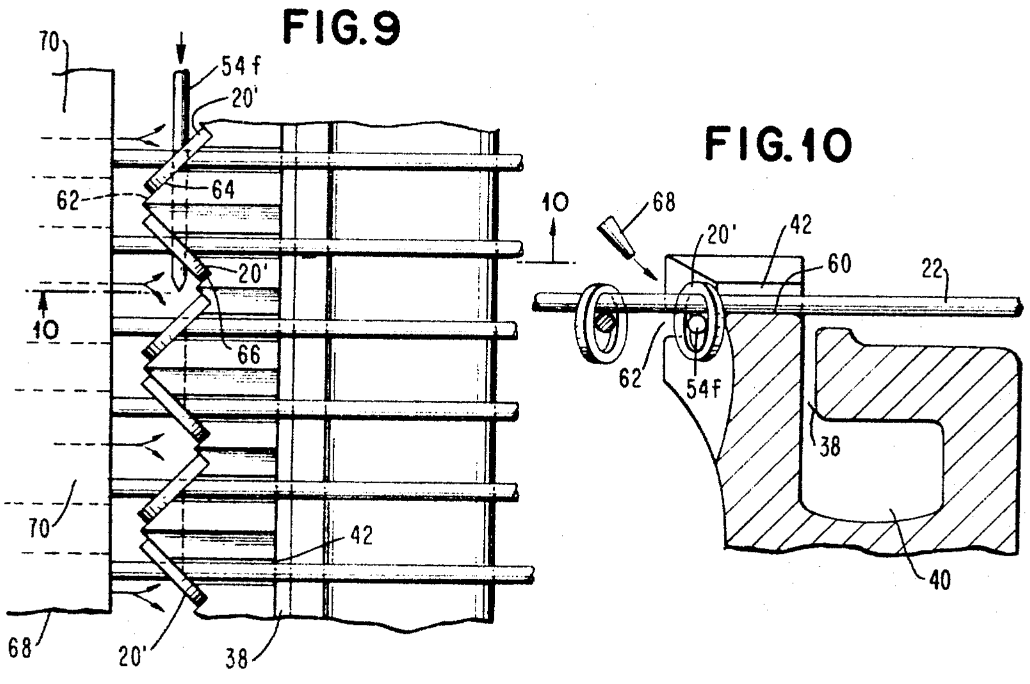
FIGURE 9 is a plan view of a portion of the matrix in FIGURE 2 showing the row of cores to be wired positioned against a reference member by air pressure.
FIGURE 10 is a sectional view taken along line 10—10 in FIGURE 9.

Once one core 20′ on each of the lines 22*a* through 22*m* is separated from the other cores on those lines, another row of cores may be wired into their matrix position by a second wire. This is illustrated in FIGURES 9 and 10. As is shown in those figures, the cores 20′ are positioned against the front face of the member 36 while a transverse wire 54*f* is threaded through them. To permit the positioning of the cores 20′ against the front face of the member 36, the member is lowered sufficiently to allow the cores 20′ to clear the top of the wiring jig portion of the member 36. For this purpose, the member 36 is mounted for vertical movement on one end of a pivot arm 56 partially shown in FIGURE 1. A screw 58 is threaded through the other end of the pivot arm 56, and the pivot point for the arm is on the supporting surface 50 between the screw 58 and the member 36. The arm 56 is spring loaded around its pivot point so that the screw 58 bears against the supporting surface 50 at all times. Therefore, the screw 58 can be turned on to raise and lower member 36 by respectively descreasing and increasing the amount of thread of the screw between the pivot arm 56 and the supporting surface 50. When member 36 is lowered, the wires 22*a* through 22*m* are above the passageways in which they had previously been positioned so that the cores 20′ can be moved along the wires to a position in front of the member 36. To advance the cores 20′ to this position, the air jet 43 is employed.

Once all the cores 20′ are positioned in front of the member 36 the member is raised by the screw 58 until the wires 22*a* through 22*m* rest on the bottom surfaces 60 of the passageways 42 as is shown in FIGURE 9. In this position, the wires 22*a* through 22*m* are located just above a horizontal slot 62 which opens to the front of the member 36. This slot 62 extends the length of the member 36 so as to permit wires to pass through it at right angles to the wires 22*a* through 22*m* on which the cores are prestrung.

As can be seen in either FIGURE 7 or FIGURE 9, the front face of the member 36 resembles a series of side by side W's when viewed from above. Two cores 20′ nest inside each of the W's with their sides against the surfaces 64 of the front face which resemble the exterior arms of the W and their edges touching the surfaces 66 resembling the interior arms of the W. The orientation of the surfaces 64 is selected so that the cores 20′ will be positioned to present the maximum aperture area to the transverse wire 54*f* being threaded through them. The cores 20′ are held in the above described position against the front face of member 36 by air directed at them from a flat nozzle 68 positioned over the wires 22 and 54*f* in front of the member 36. The nozzle 68 has a number of spaced ports 70 which direct air at the center of the W's to force the cores 20′ against the walls 64. The nozzle 68 is mounted for rotation around pivot axis 72 and during all the previous steps in the wiring operation was positioned away from the matrix being wired, so that air from the nozzle would not interfere with the completion of previous steps of the process. However, once the cores have been positioned in front of the member 36 and the member has been raised, the nozzle 68 is dropped into the position shown in FIGURE 1 so as to direct air at the cores 20′ and the member 36 to position the cores against the member. Also, since the nozzle 68 is positioned above the wires 22*a* through 22*m*, there is a downward component of force which holds the top portion of the cores 20′ against these wires. This leaves the major portion of the aperture in the cores 20′ positioned below the wires 22*a* through 22*m* and over the horizontal slot 62 in the face of the member 36. Therefore, if one could look at one side of the member 36, he could look along the slot 62 through all the cores 20′. For this reason, the wire 54f is free to move in the slot 62 through the cores 20'.

To facilitate the advance of the wire through the cores 20', the source 74 of the wire is mounted on the sliding block 48. Thus, the source 74, and therefore the wire, can be advanced with handle 52. The operator advances the source until the tip of the wire 54f is through the first core 20' on the right. Thereafter the wire 54f is fed off a coil in the source by rotating a knob 76. This increases the length of the extended portion of the wire and passes it through all the cores so that it emerges on the other side of the matrix. All the time the wire is being threaded through the cores, air from the nozzle 68 is directed at the cores 20' to hold the cores in position against the member 36 as previously described.

Besides air pressure, other means which provide a directional force may possibly be used to hold the cores 20' in position against the member 36. However, it has been found that when air pressure is employed in the manner described, the wire is much easier to thread through the cores. It appears that this is due to a lubricating effect caused by air from the nozzle 68. Apparently, the air travels around the interior sidewalls of the cores 20' and along the wire 54f being threaded through the cores to form a lubricating barrier which eases the movement of the wire 54f through the cores 20'. In any case, irrespective of reasons, the use of air to hold the cores 20' in position while they are threaded greatly simplifies the task of threading and is considered to be one of the prime reasons for the success of the present method.

Figure 11:
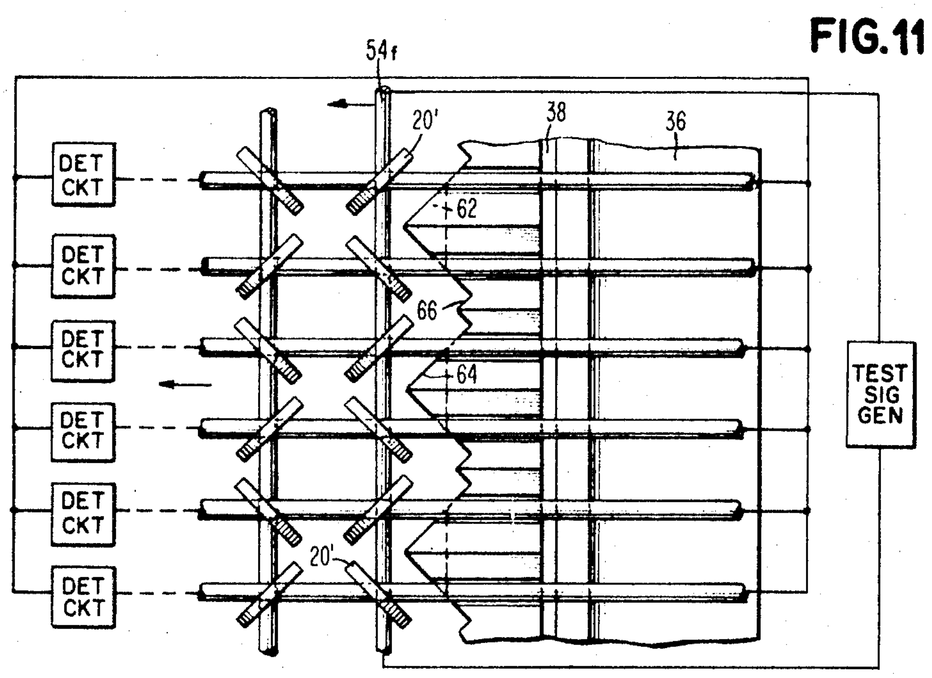
FIGURE 11 is a plan view of a portion of the matrix in FIGURE 2 showing the completion of the wiring of the second wire through a row of cores.

Once the wire 54f has been threaded through all the cores 20' the cores 20' can be tested by connecting wire 54f in series with a test signal generator and each of the wires 22a through 22m in series with individual detection circuits as is illustrated in FIGURE 11 so that a test signal can be transmitted along wire 54f and the response of the cores 20' can be individually measured with the detection circuits connected to wires 22a through 22m. If a bad core is detected it is a simple matter to break it, retract wire 54f from the row of cores and then select and wire a new row of cores to replace the row with the defective core by using the core selection and wire threading techniques described above. Later on when the matrix is completed, the removal of a defective core is more difficult. This is because it requires the partial disassembly of the completed matrix and the replacement core must be hand wired into the matrix. Besides being expensive, slow and tedious, reworking of the memory plane by hand is inferior to rewiring with the equipment disclosed in FIGURE 1 because of possible extensive damage to the matrix during reworking by hand.

It may be desirable to employ a separate test probe instead of the matrix wire for testing the cores as described above. This can be done by inserting the test probe 80 through the cores 20' from the left hand side of the frame 24 just prior to the insertion of the matrix wires 54f and retracting the test probe 80 after the test to allow the threading of wire 54f through the slot 62.

After the wire 54f has been threaded through all the cores 20' and the cores 20' have been tested, the wire 54f is fixed in position on the frame 24 by soldering each end to tinned contact areas 82 on opposite sides of the frame. With the wire 54f soldered in position, its connection to the source of wire 74 can be broken. This is best done by clamping the wire adjacent the right hand side of the frame 24 and then using the handle 52 to back the source of wire 74 away from the frame while maintaining the length of the wire substantially fixed. This causes the wire to snap at some point intermediate the point where it is clamped and source of wire 74. By breaking the wire in this manner the normally flexible copper wire will harden and become fairly rigid because of the tensile forces exerted on the wire to break it. Therefore, the tip of the wire is given a hard needle-like leading end which enables thin flexible wire to be fed through a row of cores without the use of a hollow needle. This wire hardening technique is disclosed and claimed in copending application, Ser. No. 363,481, filed Apr. 29, 1964.

With the wiring of the wire 54f completed, the machine can be employed to wire another row of cores. To facilitate this, the apertured platform 32 on which the frame 24 rests can be moved relative to the member 36 and the wiring source 74. The table is moved by rotating the knob 84 which directly drives a threaded lead screw 86. This threaded lead screw in turn drives a threaded block 88 which is fixed to the platform 34. The platform 34 is slidably mounted on guides 90 so that as the threaded block moves the platform 34 moves with it. Movement of the platform with the block 88 causes the frame 24 to move relative to the member 36 which is fixed to the work surface 50 at its pivot point. Thus, as is illustrated in FIGURE 11, the cores 20' move away from the surfaces 64 and 66 and the wire 54f moves out of open end of slot 64. Rotation of the knob 84 is stopped when the tinned pads 92 for attaching the wire 54g to the frame 24 are aligned with the now hardened tip 94 of the wire. The wire tip and the reference block remain in position and thus they are properly aligned for wiring. After the platform 34 has been advanced to the proper position the wire 54g may be wired by repeating the previously described sequence of steps, as were the wires 54a through 54e prior to the threading of wire 54f. The threading of the second wire through the cores as described above is repeated one row of cores at a time until the matrix is completed. The familiar diamond pattern of cores is obtained by moving the member 36 one wire to the right or left after wiring each row of cores.

Figure 12:
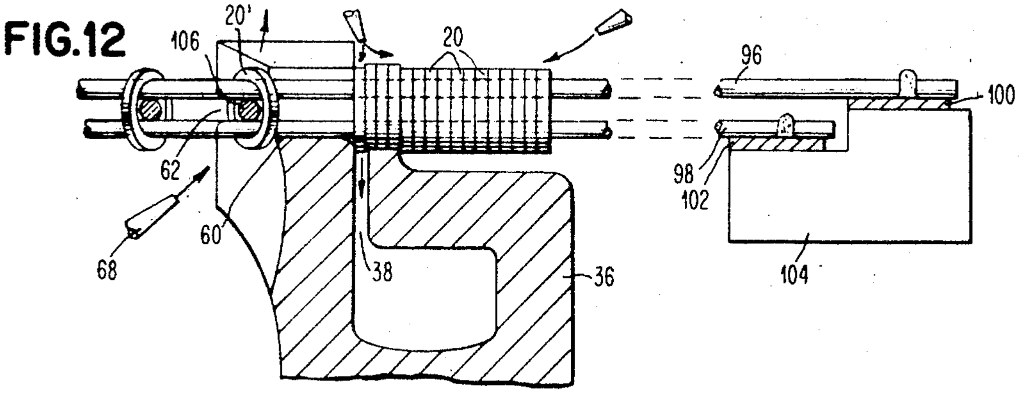
FIGURE 12 is a sectional view illustrating how a three wire core matrix can be wired with the technique illustrated in FIGURES 1 and 11.

The present invention has just been described in reference to wiring a two wire core matrix. However, three wire core matrices may be wired using the same techniques in the manner shown in FIGURE 12. Here cores 20 are prestrung on two wires instead of one wire. The two wires 96 and 98 are soldered to tinned pads 100 and 102 on a rectangular frame 104 at two different vertical heights. Thus the prestrung cores 20 are suspended in the frame in a number of parallel rows on two spaced wires. The cores are then strung in rows on the third wire 106, threaded through the spaced wires 96 and 98 of each row of prestrung cores in much the same manner as was described with respect to the wiring of the two wire matrix as illustrated in FIGURES 1 through 11.

The selection of a row of cores to be wired is accomplished in the same manner as described previously. Also, after selection the selected cores are moved to the front of the member 36 and held against the member 36 by air pressure in the same way as was discussed earlier. The lower wire 98 rests on the bottom surface 60 of the passageway 42 below the slot 62 and the vertical distance between the wires 96 and 98 is such that the other wire 96 passes over the top of the slot 62. Therefore the transverse wire 106 is free to pass along the slot 62 through the cores 20' in the space between the wires 96 and 98. It should be apparent that in FIGURE 12 the nozzle 68 is positioned below the wires instead of on top of the wires as it is in FIGURES 1 to 11. This lower position of the nozzle 68 is preferred since it has been found that it reduces the air turbulence around the wires and the cores making it easier to string the third wire 106 through the other two wires 96 and 98. As pointed out above, aside from the position of the air nozzle 68 and the positioning of the two wires, the method is essentially the same as that described previously.

Figure 13:
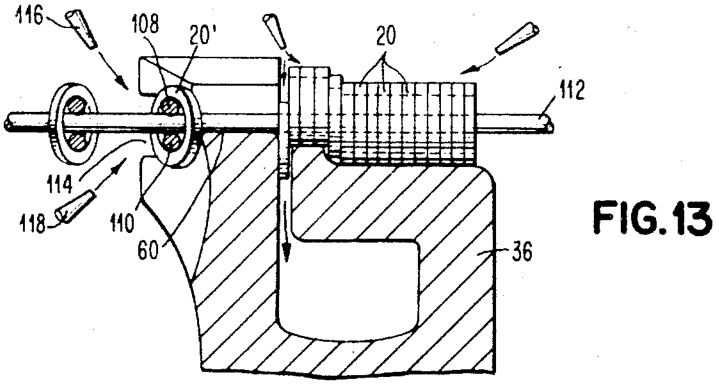
FIGURE 13 is a sectional view illustrating an alternative way of fabricating a three wire core matrix with the techniques illustrated in FIGURES 1 to 11.

The embodiment shown in FIGURE 13 illustrates the stringing of two transverse wires 108 and 110 through cores 20 which are prestrung on one wire 112. To facilitate this, the reference block 36 has a larger opening 114 in its face to accept both transverse wires 108 and 110 and the bottom edges 60 of the passageways 42 support the wires 112 halfway in the middle of the slot 114 instead of one side or the other of the slot. In addition, two nozzles are employed, one 116 on top of the transverse wire 108 and the other 118 on the bottom of the wire 110.

By employing these two jets alternately, it is possible to first string one wire 108 through on top of the wire 112 and then string the other wire 110 on the bottom of the wire 112. This is accomplished by first using air from nozzle 118 to force the cores 20′ upward while wire 108 is strung through the cores and thereafter using air from nozzle 116 to force the cores downward while the second transverse wire 110 is strung through the cores.

Obviously a number of modifications can be made in the above described apparatus and process may be made without departing from the spirit and scope of the present invention. For instance, the cores 20 may be prestrung on the wires 22 by means other than that shown in FIGURE 3. Therefore, while the invention has been particularly shown and described with reference to three preferred embodiments thereof, it will be understood by those skilled in the art that various changes in form and details may be made therein without departing from the spirit and scope of the invention.

What is claimed:

1. A method for threading a wire through the apertures of cores arranged in a row and slidably prestrung on separate length of wire arranged transversely to said row comprising directing fluid at the cores to cause the cores to slide along the longitudinal axes of lengths of wire and against a reference member to form said row and passing a wire through the apertures in the cores while holding the cores in position against the reference member with the fluid directed at the cores.

2. A method of testing a matrix of apertured magnetic cores during the wiring of the matrix comprising the steps of stringing cores on wire, arranging the wire with the cores strung thereon in side by side lengths to form rows of cores slidable along a first axis, advancing cores along the lengths of wire and arranging them into a row along a second axis transverse to the first axis, threading a test probe through the apertures of the cores arranged in a row along the second axis, transmitting an electrical signal along the test probe to test the operation of the cores arranged in a row along the second axis, removing the test probe, inserting a wire through the apertures of the tested row of cores, and repeating the last five previous steps with other cores strung on the lengths of wire until the matrix is complete.

3. A method of wiring a matrix of apertured cores comprising the steps of:

(a) arranging a number of lengths of wire, with apertured cores strung on them, side by side to form substantially parallel columns of cores in which the cores are free to slide independently of one another along the axes of the columns, on the lengths of wire;

(b) separating selected cores in different columns from the remainder of the cores in the columns, advancing each selected core along the wire on which it is strung to a core wiring station and orienting the selected cores to form a first row of cores made up of cores, in different columns, that are configured to receive a wire threaded along the row;

(c) threading a wire through the core apertures in said first row of cores while maintaining the core apertures in said first row in a wire receiving orientation and spaced from other cores in the column which after the threading of said first row are still free to slide independently of each other along the axes of said columns on the lengths of wire; and (d) repeating steps b and c with other of the cores still free to slide on the lengths of wire after completion of the wiring of said first row.

4. The method of claim 3 wherein the cores are oriented and held in their wire receiving orientation by directing fluid at the cores to force and hold them against a reference member.

5. The method of claim 4 wherein the cores are advanced along the wires by directing fluid at the cores.

6. A method of wiring a matrix of apertured cores comprising the steps of:

(a) arranging a number of lengths of wire with apertured cores strung on them side by side to form substantially parallel columns of cores in which the cores are free to slide independently of one another along the axes of the columns of the lengths of wire;

(b) separating a selected core in the columns from the remainder of the cores in the columns and advancing selected cores along the wire on which they are strung to a core wiring station and orienting the selected cores to form a selected row of cores which includes cores in different columns that are configured to receive a wire threaded along the row;

(c) passing a wire through the core apertures in said selected row of cores while maintaining the core apertures in said selected row in a wire receiving position and spaced from the other cores in the column which after the threading of said selected row are still free to slide independently of each other along the axes of said columns on the lengths of wire;

(d) testing the cores in said selected row; and (e) repeating steps b, c and d with other cores slidably mounted on the lengths of wire after the testing of said selected row.

7. A method of wiring a matrix of apertured cores comprising the steps of:

(a) arranging a number of lengths of wire, with apertured cores strung on them, side by side to form substantially parallel columns of cores in which the cores are free to slide independent of one another along the axes of the columns on the lengths of wire;

(b) separating a selected core in each column from the remainder of the cores in the column, advancing each selected core along the wire on which it is strung to a core wiring station and orienting the selected cores to form a selected row of cores made up of cores in different columns that are configured to receive a wire threaded along the row;

(c) passing a wire through the core apertures in said selected row of cores while maintaining the core apertures in said selected row in a wire receiving orientation and spaced from the other cores in the column which after the threading of said selected row are still free to slide independently of each other along the axes of said columns on the lengths of wire;

(d) testing the cores in said selected row;

(e) rewiring the selected row if the test results are unacceptable; and (f) repeat steps b, c and d with other cores slidably mounted on the lengths of wire after the test results on said selected row are acceptable.

8. A method of wiring a matrix of apertured cores comprising the steps of:

(a) arranging a number of lengths of wire, with apertured cores strung on them, side by side to form substantially parallel columns of cores in which the cores are free to slide independently of one another along the axes of the columns, on the lengths of wire;

(b) separating a selected core in each column from the remainder of the cores in the columns, advancing each core so separated along the wire on which it is strung to a core wiring station and orienting the selected cores to form a selected row of cores which is made up of cores in different columns that are configured to receive a wire threaded along the row;

(c) threading a wire through the core apertures in said selected row of cores while maintaining the core apertures said selected row in a wire receiving orientation and spaced from other cores in the column which after the threading of said selected row are still free to slide independently of each other along the axes of said columns on the lengths of wire;

(d) transmitting an electrical signal along the wire threaded through the selected row of cores;

(e) detecting electrical signals along the lengths of wire to test the operation of the cores in the selected row of cores; and (f) repeating steps b, c, d and e with other of the cores still free to slide on the lengths of wire after completion of the testing of the selected row.

9. A method of wiring a matrix of apertured cores comprising the steps of:

(a) arranging a number of lengths of wire, with apertured cores strung on them, side by side to form substantially parallel columns of cores in which the cores are free to slide independently of each other along the axes of the columns, on the lengths of wire;

(b) separating cores on different columns from the remainder of the cores in the columns, advancing each selected core along the wire on which it is strung to a core wiring station and orienting the selected cores to form a selected row of cores which is made up of cores in different columns that are configured to receive a wire threaded along the row;

(c) threading a wire through the core apertures in said selected row of core while maintaining the core apertures in said selected row in a wire receiving orientation and spaced from other cores in the column which after the threading of said selected row are still free to slide independently of each other along the axes of said columns on the lengths of wire;

(d) transmitting an electrical signal along the wire threaded through the selected row of cores;

(e) detecting electrical signals along the lengths of wire to test the operation of the cores in the selected row of cores;

(f) rewiring the first row of cores if the testing proves unacceptable; and (g) repeating steps b, c, d, e and f with other of the cores still free to slide on the lengths of the wire after completion of the testing of the selected row.

10. A method of wiring a matrix of apertured cores comprising the steps of:

(a) arranging a number of lengths of wire, with apertured cores strung on them, side by side to form substantially parallel columns of cores in which the cores are free to slide independently of one another along the axes of the columns, on the lengths of wire;

(b) advancing cores in the columns of cores along the wire to a core wiring station;

(c) separating the first core in each column from the remainder of the cores in the column and orienting the first core in each column to form a selected row of cores which is made up of cores in different columns that are configured to receive a wire threaded along the row;

(d) threaded a wire through the core apertures in said selected row of cores while maintaining the core apertures in said selected row in a wire receiving orientation and spaced from other cores in the column which after the threading of the selected row are still free to slide independently of one another along the axes of the columns on the lengths of wire; and (e) repeating steps b, c and d with other of the cores still free to slide on the lengths of wire after completion of the wiring of said selected row.

11. A method of wiring a matrix of apertured cores comprising the steps of:

(a) arranging a number of lengths of wire, with apertured cores strung on them, side by side to form substantially parallel columns of cores in which the cores are free to slide independently of one another along the axes of the columns, on the lengths of wire;

(b) advancing cores of the columns of cores along the wire to a core wiring station;

(c) separating the first core in each column from the remainder of the cores in the column and orienting the first core in each column to form a selected row of cores which is made up of cores in different columns that are configured to receive a wire threaded along the row;

(d) threading a wire through the core apertures in said selected row of cores while maintaining the core apertures in said selected row in a wire receiving orientation and spaced from other cores in the column which after the threading of said selected row are still free to slide independently of one another along the lengths of wire;

(e) transmitting an electrical signal along the wire threaded through the selected row of cores;

(f) detecting electrical signals along the lengths of wire to test the operation of the cores in the selected row of cores;

(g) rewiring the selected row of cores if the testing proves unacceptable; and (h) repeating steps b, c, d, e and f with other of the cores still free to slide on the lengths of wire after completion of the testing of said selected row.

References Cited

UNITED STATES PATENTS 3,134,163 5/1964 Luhn ------------- 29—241 X

FOREIGN PATENTS 35,705 1885 Germany.

JOHN F. CAMPBELL, Primary Examiner

R. W. CHURCH, Assistant Examiner

U.S. Cl. X.R.

28—15; 29—203, 241, 433, 593; 139—34, 420; 223—48; 340—174